(12) United States Patent
Karasawa

(10) Patent No.: US 6,981,721 B2
(45) Date of Patent: Jan. 3, 2006

(54) JOINT FOR HIGH PRESSURE FLUID

(75) Inventor: Yukihiko Karasawa, Saitama (JP)

(73) Assignee: Karasawa Fine, LTD, Saitama (JP)

( * ) Notice: Subject to any disclaimer, the term of this patent is extended or adjusted under 35 U.S.C. 154(b) by 70 days.

(21) Appl. No.: 10/476,162

(22) PCT Filed: May 29, 2002

(86) PCT No.: PCT/JP02/05240

§ 371 (c)(1),
(2), (4) Date: Apr. 2, 2004

(87) PCT Pub. No.: WO02/099327

PCT Pub. Date: Dec. 12, 2002

(65) Prior Publication Data

US 2004/0164552 A1    Aug. 26, 2004

(30) Foreign Application Priority Data

Jun. 4, 2001    (JP) .............................. 2001-168292

(51) Int. Cl.
*F16L 17/00*    (2006.01)
(52) U.S. Cl. ...................................... 285/353; 285/384
(58) Field of Classification Search ................ 285/353, 285/384, 388

See application file for complete search history.

(56) References Cited

U.S. PATENT DOCUMENTS

| 676,846 | A | * | 6/1901 | Moran | 285/281 |
| 2,562,294 | A | * | 7/1951 | Cahenzli, Jr. | 285/148.23 |
| 5,634,674 | A | * | 6/1997 | Fuser | 285/353 |
| 6,302,451 | B1 | * | 10/2001 | Olson | 285/330 |

FOREIGN PATENT DOCUMENTS

| JP | 12786/1985 | 1/1985 |
| JP | 14084/1988 | 1/1988 |
| JP | 132288/1992 | 12/1992 |
| JP | 11-325341 | 11/1999 |

* cited by examiner

*Primary Examiner*—David Bochna
(74) *Attorney, Agent, or Firm*—Muramatsu & Associates

(57) ABSTRACT

A coupling for high-pressure fluid achieves a long life by easily tackling wear at a connected portion due to flow of high-pressure slurry. The coupling is configured by a pipe having an inverse male screw near an end thereof; a bush being screwed to the inverse male screw; a box nut having a larger diameter hole, through which the bush can pass, on a tip end side, and a small diameter hole, through which the pipe passes, on a base end side; a block having a female screw hole that is screwed to the box nut; a washer made from soft material which is to be inserted in an accommodating space at an end portion of the fluid route; and a ring being screwed to a female screw of the female screw hole; and a polygonal hole drilled to the ring are provided, and the end portion of the pipe which passes the box nut and of which end face abuts the washer is supported by the polygonal hole.

3 Claims, 7 Drawing Sheets

JOINT FOR HIGH PRESSURE FLUID

FIELD OF THE INVENTION

The present invention relates to devices handling a variety of fluids such as high-pressure slurry, and more particularly to tube fittings through which high-pressure fluid passes.

BACKGROUND ART

Conventional tube fittings for high-pressure fluid are shown in FIG. 10. In this figure, an end of a pipe 1 forming a route for high-pressure fluid is provided with a tapered face 1a, and an inverse male screw 1b follows the tapered face 1a. Then, a box nut 2 is inserted from the end of the pipe 1.

FIGS. 11(a) and 11(b) show the box nut 2, in which FIG. 11(a) is a cross-sectional view taken along the line XI—XI of FIG. 11(b), and FIG. 11(b) is a side view. As illustrated in these figures, the box nut 2 is provided with a hole with a step, and the diameter of a larger hole 2a on the end side is larger than the diameter of a smaller hole 2b on the rear end side, which has a diameter that the pipe 1 passes with a slight clearance. The outside of the box nut 2 on the rear end side is a hexagonal fastening portion 2c to be fastened with wrenches or the like. After the box nut 2 is inserted to the pipe 1, then, a bush 3 is screwed to the inverse male screw 1b.

Reference numeral 4 shows a block. The block 4 is provided with a female screw hole 5. On the bottom portion of the female screw hole 5 is opened a fluid route 6. An inlet portion of the fluid route 6 is a tapered face 6a.

An end portion of the pipe 1 is inserted into the female screw hole 5, and a male screw on the outer surface of the box nut 2 is screwed to a female screw of the female screw hole 5, which causes the box nut 2 to enter deep into the recess of the female screw hole 5 while rotating. At this moment, the box nut 2 and the bush 3 contact with each other at both ends thereof, so that the friction due to the contact causes the box nut 2 and the bush 3 to rotate together. Because the female screw hole 5 has a regular screw (for example, a right screw) while the bush 3 and the inverse male screw 1b have inverse screws (for example, left screws), the bush 3 moves in a direction opposite to the movement of the box nut 2. As a result, the bush 3 functions as a locking means for the box nut 2, and the pipe 1 proceeds in the female screw hole 5 until the tapered face 1a at an end of the pipe 1 contacts the tapered face 6a at the inlet portion of the fluid route 6. Further, strongly fastening the fastening portion 2c of the box nut 2 with wrenches or the like allows the tapered face 1a to press-contact to the tapered face 6a, which connects the route for fluid on the pipe 1 side and the fluid route 6 on the block 4 side with each other.

PROBLEMS TO BE SOLVED BY THE INVENTION

However, the above-mentioned coupling has the following problems. At first, when mounted, the tapered face 1a and the tapered face 6a deform in the same manner at the same portion on the circumferential peripheries of the tapered face 1a and the tapered face 6a to prevent leakage, so that when the coupling is mounted again after dismounted once, it is necessary to perfectly coincide the tapered face 1a and the tapered face 6a deformed at the first mounting with each other, or different deformed faces thereof are further strongly pressed to each other through tightening to generate new deformed faces. Since the former operation for perfectly coinciding the deformed portions with each other is actually impossible, the latter, that is, the further tightening operation is usually adopted, but, the degree of tightening required to stop the leakage, when leakage occurs, cannot be expressed numerically, thus, the tightening is required until the leakage stops.

When the fluid is slurry, it leaks through the above minute clearance. The velocity of the leaked slurry becomes faster the smaller the clearance is. As a result, the both faces of the tapered face 1a and the tapered face 6a are flawed to have streams almost instantly. Therefore, even though the tightening to prevent leakage is executed, during this tightening operation, further slurry enters into minute clearances where further leakage occurs, which causes the flaw that is generated on the tapered face 1a and the tapered face 6a becomes deeper and deeper, so that the tightening operation is useless to prevent leakage.

For the above reason, under the aforementioned condition, the pipe 1 was removed and the tapered face 1a at an end of the pipe and the tapered face 6a of the block were ground or polished to use these parts again so far.

However, grinding or polishing the tapered face 1a gradually shortens the length of the pipe 1, and grinding or polishing the tapered face 6a causes the tapered face of the tapered face 6a becomes deeper and deeper. On the other hand, the length of the pipe 1 is fixed, so that repeated grinding or polishing results in the tapered face 1a and the tapered face 6a not to closely contact with each other before long even if the box nut 2 is tightened. In the conventional tube fittings shown in FIG. 10, grinding or polishing operation is limited to twice to secure the close contact of the fittings, and new fittings should be purchased at the third operation.

The present invention has been made to solve the above problems, and the object thereof is to prove a long-lived coupling for high-pressure fluid, which is able to easily tackle the wear at the connected portion due to high-pressure slurry.

DISCLOSER OF INVENTION

To achieve the above object, a coupling for high-pressure fluid according to the present invention, which connects a pipe in which high-pressure fluid flows, and a fluid route formed in a block with each other by press-contacting an end of the pipe to the fluid route, is characterized in that a replaceable soft washer is inserted into an end of the fluid route, and the washer and an end face of a pipe is press-contacted with each other.

Another coupling for high-pressure fluid according to the present invention characteristically comprises:

a pipe having an inverse male screw near an end thereof;

a bush having a larger diameter than that of the pipe, the bush being screwed to the inverse male screw;

a box nut having a larger diameter hole, through which the bush can pass, on a tip end side, and a small diameter hole, through which the pipe passes, on a base end side;

a block having a female screw hole that is screwed to the box nut;

a fluid route opened at a bottom portion of the female screw hole of the block;

a washer made of soft material, the washer being inserted in an accommodating space at an end portion of the fluid route on the female screw hole side; and a ring being screwed to a female screw of the female screw hole to support the washer at a predetermined position, the ring having a polygonal hole for supporting an end portion of the pipe which passes the box nut and of which end face contacts the washer.

Further, the coupling for high-pressure fluid according to the present invention characteristically comprises:

a pipe having an inverse male screw near an end thereof;

a bush having a larger diameter than that of the pipe, the bush being screwed to the inverse male screw;

a box nut having a larger diameter hole, through which the bush can pass, on a tip end side, and a small diameter hole, through which the pipe passes, on a base end side;

a block having a female screw hole that is screwed to the box nut, and a notched portion through which the pipe to which the bush is screwed can pass;

a fluid route opened at a bottom portion of a female hole of the block;

a washer made of soft material, the washer being accommodated in a space at an end portion of the fluid route on the female screw hole side; and a C-shaped ring having a polygonal hole at a central portion thereof, a male screw at the outer periphery thereof that is screwed to a female screw of the female screw hole and an opening that is overlapped with the notched portion though which the end of the pipe can pass; and a polygonal ring being engaged with the polygonal hole of the C-shaped ring, the polygonal ring having a hole for supporting the end portion of the pipe at a central portion thereof.

In the above couplings for high-pressure fluid, an opening, through which the end portion of the pipe can pass, may be provided with the polygonal ring at a position where it overlaps with the opening of the C-shaped ring, or alternatively the end faces of the pipes may be ring-shaped circular faces.

BRIEF DESCRIPTION OF THE DRAWING

FIGS. 3(a) and 3(b) show a washer, in which FIG. 3(a) is a cross-sectional view taken along the line III—III of FIG. 3(b), and FIG. 3(b) is a side view; FIGS. 4(a) and 4(b) show a ring, in which FIG. 4(a) is a cross-sectional view taken along the line IV—IV of FIG. 4(b), and FIG. 4(b) is a side view; FIGS. 5(a) and 5(b) show a coupling for high-pressure fluid according to the second embodiment of the present invention, in which FIG. 5(a) is a longitudinally cross-sectional view, and FIG. 5(b) is a cross-sectional view taken along the line V—V of FIG. 5(a); FIGS. 7(a) and 7(b) show a C-shaped ring, in which FIG. 7(a) is a cross-sectional view taken along the line VII—VII of FIG. 7(b), and FIG. 7(b) is a side view; FIGS. 8(a) and 8(b) show a polygonal ring, in which FIG. 8(a) is a cross-sectional view taken along the line VIII—VIII of FIG. 8(b), and FIG. 8(b) is a side view; FIGS. 9(a) and 9(b) show a coupling for high-pressure fluid according to the third embodiment of the present invention, in which FIG. 9(a) is a longitudinally cross-sectional view, and FIG. 9(b) is a cross-sectional view taken along the line IX—IX of FIG. 9(a); FIGS. 11(a) and 11(b) show a box nut, in which FIG. 11(a) is a cross-sectional view taken along the line XI—XI of FIG. 11(b), and FIG. 11(b) is a side view.

EMBODIMENTS

Embodiments of the present invention will be explained below with reference to drawings.

Figure 1:
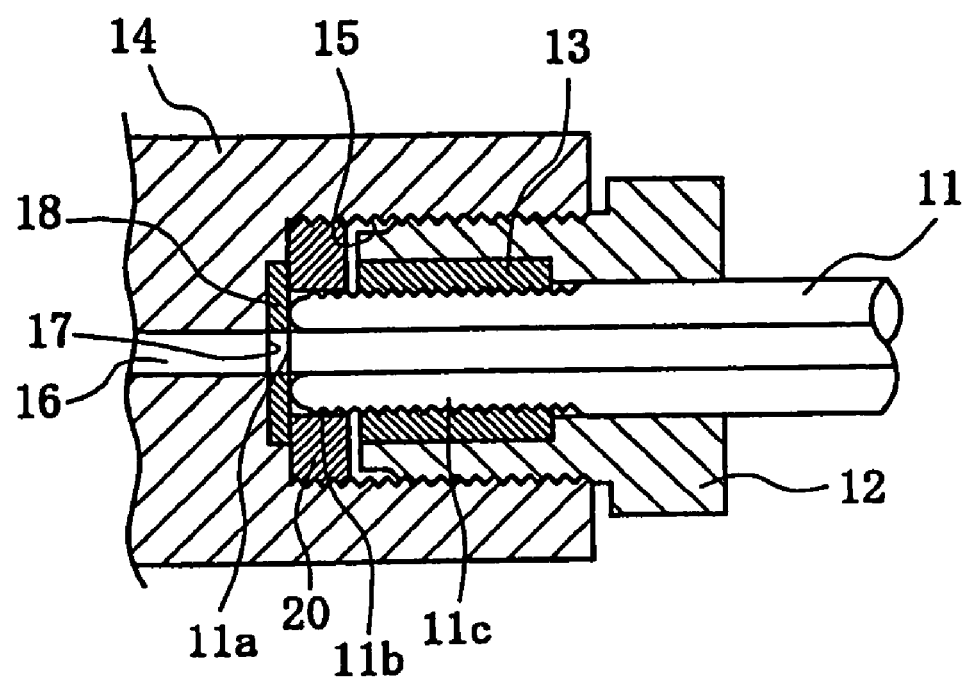
FIG. 1 is a cross-sectional view of a coupling for high-pressure fluid according to the first embodiment of the present invention.

FIG. 1 is a cross-sectional view of a coupling for high-pressure fluid according to the first embodiment of the present invention. An end face 11a of a pipe 11 is not a tapered face like the conventional one, but the face 11a is a face perpendicular to the axis of the pipe 11. The end face may be flat, in this embodiment, besides that, the face is ring-shaped and is a rounded circular face like one side of a doughnut.

An end portion 11b of the pipe 11 is provided with an inverse male screw 11c. To the inverse male screw 11c is screwed a bush 13 with an inner female screw.

Figure 11A:
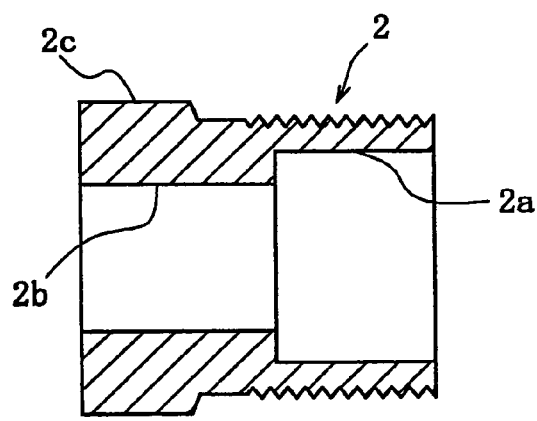
Figure 11B:
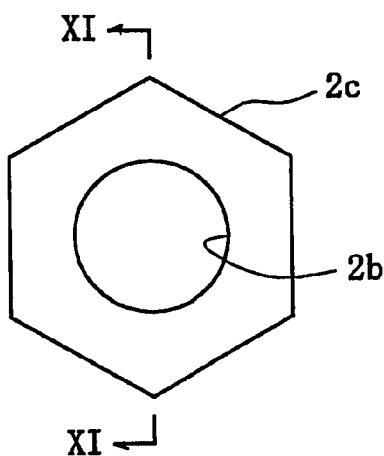

A box nut 12 has the same construction as the box nut 2 shown in FIG. 11. That is, a hole with a step is drilled inside, and the diameter of a larger hole on the end side is slightly larger than the outer diameter of the bush 13, and the diameter of a smaller hole on the rear end side slightly larger than the outer diameter of the pipe 11.

Figure 2:
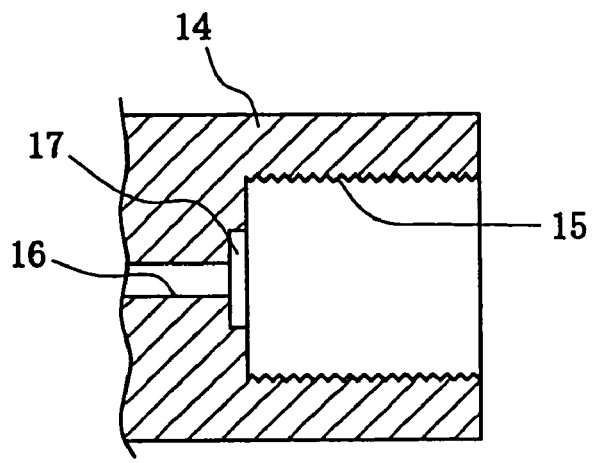
FIG. 2 is cross-sectional view of a block.

FIG. 2 is a cross-sectional view of a block. The block 14 is provided with a female screw hole 15, and at the bottom portion of the female screw hole 15 is opened to form a fluid route 16. The inlet portion of the fluid route 16 is enlarged to form an accommodating space 17, in which a washer 18 made of soft material is accommodated.

Figure 3A:
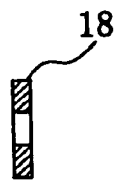
Figure 3B:
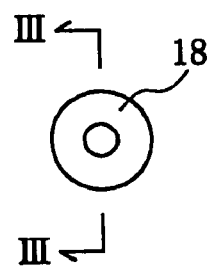

FIGS. 3(a) and 3(b) show the washer 18, in which FIG. 3(a) is a cross-sectional view taken along the line III—III of FIG. 3(b), and FIG. 3(b) is a side view. As illustrated in these figures, the washer 18 is formed to be a disk with a hole. This washer 18 is made of material softer than that of the pipe 11, such as soft iron, copper, brass and plastics.

The washer 18 is, as shown in FIG. 1, to be accommodated in the accommodating space 17 of the fluid route 16. Under the condition, the washer 18 is unstable since it is liable to jump out of the accommodating space 17 and drop therefrom. Then, the ring 20 is mounted to prevent the drop of the washer 18.

Figure 4A:
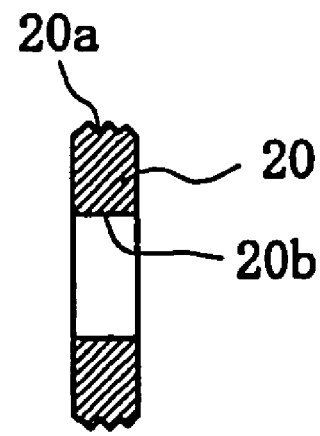
Figure 4B:
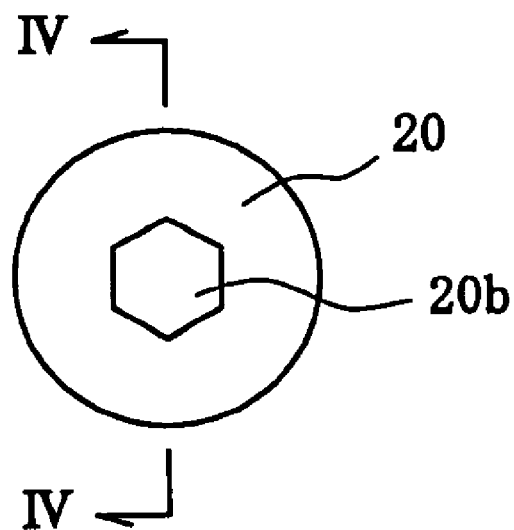

FIGS. 4(a) and 4(b) show a ring 20, in which FIG. 4(a) is a cross-sectional view taken along the line IV—IV of FIG. 4(b), and FIG. 4(b) is a side view. As illustrated in these figures, the ring 20 is provided with a male screw 20a outside of a thick disk, and a polygonal hole 20b is drilled at the central portion thereof. The end portion 11b of the pipe 11 is an inscribed circle of the polygonal hole 20b. In this embodiment, the polygonal hole 20b is hexagon, but variety of shapes such as a triangle, a square, a pentagon and an octagon can be adopted.

Next, assembling procedure of the coupling for high-pressure fluid will be explained. At first, the washer 18 is inserted into the accommodating space 17 that is formed in the fluid route 16 of the block 14. Then, the ring 20 is screwed from the inlet of the female screw hole 15 to prevent the washer 18 from dropping out of the accommodating space 17. In order to screw the ring 20 to the female screw hole 15, a polygonal rod or a wrench adapted to the polygonal hole 20b is prepared. And, this rod or wrench is inserted into the polygonal hole 20b to screw the ring 20 to the female screw hole 15. When the ring 20 abuts the washer 18 or the bottom face of the female screw hole 15, it is tightened with the wrench, or it is strongly tightened with the polygonal rod that is rotated by a spanner. In consideration that a spanner is used for the tightening, as a polygon of the polygonal hole 20b, as described in this embodiment, a hexagon or square is preferable. When the polygon has odd angles, spanners cannot be used. Further, when the polygon has more than or equal to eight angles, the shape becomes similar to a circle, so that tightening force cannot be increased. When a hexagon and a square are compared, a square causes the thickness of corner portions to be thin, resulting in weakness of the portions. For the above reasons, a hexagon is most preferable.

Next, the box nut 12 is inserted from the end of the pipe 11. The box nut 12 is moved rearward from the inverse male screw 11c of the pipe 11. Under the condition, the end portion 11b of the pipe 11 is maintained so as to project from the rear end side of the bush 13 where the bush 13 is screwed to the inverse male screw 11c. The bush 13 may be positioned in the middle of the inverse male screw 11c without any problem.

The box nut 12 is moved toward the end of the pipe 11 so as to be screwed to the female screw hole 15 of the block 14. Since the step between the larger diameter portion and the smaller diameter portion of the box nut 12 press-contacts the rear end face of the bush 13, the contact friction rotates the bush 13. However, the screw of the box nut 12 and that of the bush 13 are inversely formed with each other, which causes the bush 13 to move in a direction that the bush 13 is fastened. As a result, the bush 13 functions as a stopper for the box nut 12.

The pipe 11 proceeds in the female screw hole 15 and the end face 11a thereof contacts the washer 18 that is accommodated in the inlet of the fluid route 16. Further strongly tightening the fastening portion of the box nut 12 with spanners or the like, the end face 11a is strongly press-contacted to the washer 18, which allows the fluid route on the pipe 11 side and the fluid route 16 on the block 14 side to be connected with each other.

At this moment, since the end face 11a of the pipe 11 is circularly curved and rounded, the end face 11a and the washer 18 contact with each other as a contact of a plane and a line, which is superior in contractibility to a contact between two planes. As a result, leakage is not liable to occur even if high-pressure fluid flows.

In addition, the end portion 11b of the pipe 11 engages the polygonal hole 20b of the ring 20 without clearance. As a result, the pipe 11 is supported at two portions that are the rear end portion of the box nut 12 and the end portion 11b engaging the ring 20, which provides a stable support.

When the coupling is separated, firstly, the box nut 12 is loosened so as to be removed from the female screw hole 15, and the box nut 12 is retreated to the rear of the pipe 11. Then, the end portion 11b of the pipe 11 is drawn out of the polygonal hole 20b of the ring 20, which allows the pipe 11 to be removed from the block 14. After that, the screw of the ring 20 is loosened to remove the ring 20, and the washer 18 is drawn out.

In the construction of the coupling for high-pressure fluid shown in FIG. 1, repeated mounting and dismounting and high-pressure slurry generate friction at the press-contact portion between the end face 11a of the pipe 11 and the washer 18 as well. However, the washer 18 is soft, so that only the washer 18 wears, and the pipe 11 hardly wears. As a result, when the wear of the washer 18 progresses, only the washer 18 has to be replaced, and the pipe 11 can be used continuously as it is. Further, even if the end face 11a of the pipe 11 must be ground or polished, the thickness of the washer 18 is complementarily thickened by the length that the pipe 11 is shortened to cope with the case.

In the above embodiment, in case that the pipe 11 is mounted on or dismounted from the block 14, the pipe 11 must be moved in a direction of its axis until the end face 11a of the pipe 11 reaches the outside of the female screw hole 15 of the block 14. However, in an actual device, the other end of the pipe 11 is also fixed to another block or the like, so that it is not easy to longitudinally move the pipe 11.

Figure 5A:
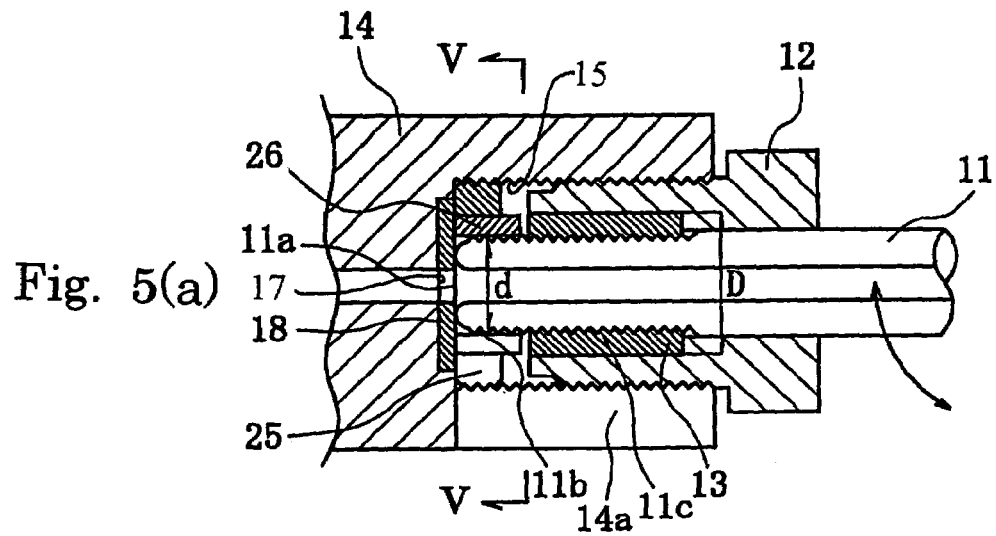
Figure 5B:
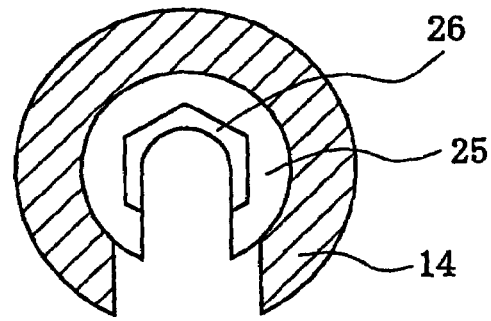

FIGS. 5(a) and 5(b) show a coupling for high-pressure fluid according to the second embodiment of the present invention, in which FIG. 5(a) is a longitudinal cross-sectional view, and FIG. 5(b) is a cross-sectional view taken along the line V—V of FIG. 5(a). This embodiment is for resolving the above-mentioned problem. In this embodiment, the pipe 11 cannot be moved in a direction of its length but this embodiment utilizes the fact that the pipe 11 can swing about the other end in the direction indicated by the arrow in FIG. 5(a). The pipe 11, the box nut 12 and the bush 13 are the same as those in the first embodiment. The washer 18 has the hole with the same inner diameter as that in the first embodiment, but has a larger outer diameter than that in the first embodiment.

Figure 6:
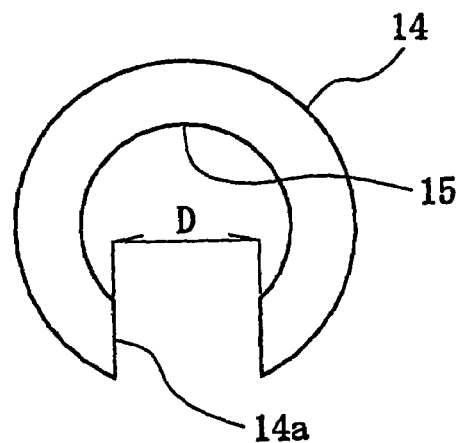
FIG. 6 is an end face view of a block.

FIG. 6 is an end face view of the block 14. As illustrated in FIGS. 5 and 6, at any portion (lower portion in the figure) of the female screw hole 15 of the block 14 is formed a notched portion 14a. The width D of the notched portion 14a is almost the same as the width D of the bush 13 such that the bush 13 easily passes through. The length of the notched portion 14a is almost the same as the depth of the female screw hole 15. That is, the pipe 11 with screwed bush 13 swings in the direction indicated by the arrow in FIG. 5, and the pipe 11 can enter the female screw hole 15 from the notched portion 14a and can retreat out of the female screw hole 15.

Figure 7A:
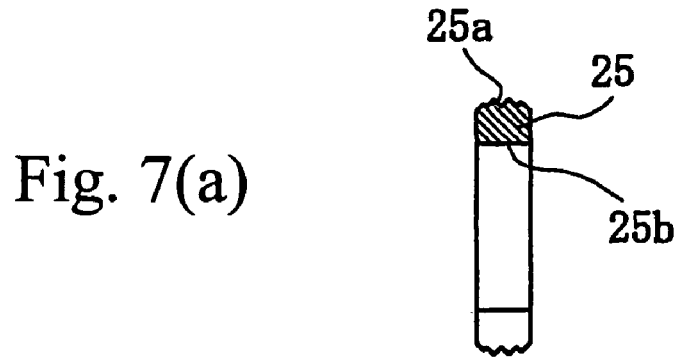
Figure 7B:
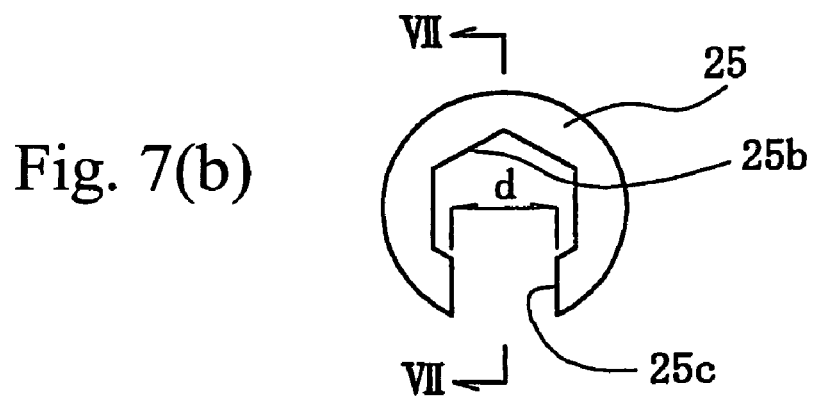

FIGS. 7(a) and 7(b) show a C-shaped ring 25, in which FIG. 7(a) is a cross-sectional view taken along the line VII—VII of FIG. 7(b), and FIG. 7(b) is a side view. This C-shaped ring 25 is similar to the ring 20 in the first embodiment. That is, the C-shaped ring 25 is provided with a male screw 25a on the outer periphery thereof and a polygonal hole 25b in the middle thereof. However, it differs from the ring 20 in that the C-shaped ring 25 has an opening 25c and the dimension of the polygon is larger than the polygonal hole 20b of the ring 20. The width d of the opening 25c is almost the same as the diameter d of the end portion 11b of the pipe 11 such that the end portion 11b can easily pass through.

In order to coincide the opening 25c and the notched portion 14a with each other, the following procedure will be taken. At first, the C-shaped ring 25 without opening 25c, that is, ring-shaped one is prepared, and is screwed into the female screw hole 15 with a wrench or a rod inserted in the central polygonal hole 25b. At this moment, the washer 18 is mounted at a predetermined position. After the C-shaped ring 25 is securely fastened and fixed, a portion that is concentric with the notched portion 14a as well as coinciding with the diameter of the end portion 11b of the pipe 11 is marked with a marker or the like. After the marking, the C-shaped ring 25 is removed once and is cut at the marked position to form the opening 25c. Then, screwing the C-shaped ring 25 to the female screw hole 15 again results in the C-shaped ring 25 and the notched portion 14a to be concentrically overlapped with each other.

As illustrated in FIGS. 5(a) and 5(b), the polygonal ring 26 is fixed in the C-shaped ring 25.

Figure 8A:
Figure 8B:
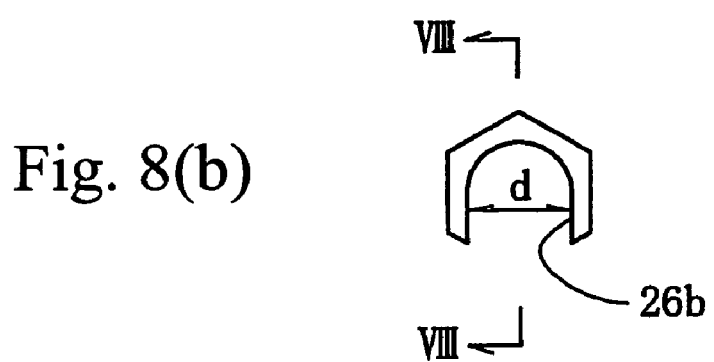

FIGS. 8(a) and 8(b) show the polygonal ring 26, in which FIG. 8(a) is a cross-sectional view taken along the line VIII—VIII of FIG. 8(b), and FIG. 8(b) is a side view. The polygonal ring 26 has the same outer shape as the polygonal hole 20b of the C-shaped ring 25, and is inserted into the hole 20b without any clearance. Then, a round hole 26a is positioned at the center of the polygonal ring 26, and the opening 26b is formed to be in communication with the hole 26a. The opening 26b is positioned in such a manner as to be concentric with the opening 25c. The diameter of the hole 26a and the width of the opening 26b are indicated by the same label d, to which the end portion 11b of the pipe 11 is inserted easily and without looseness.

The opening 26b is formed as described below. After the opening 25c is formed, the polygonal ring 26 without the opening 26b is fitted in the polygonal hole 25b, and the shape of the opening 26b is marked at the same position as the opening 25c. After marked with a marker, the polygonal ring 26 is removed once. After being removed, the polygonal ring 26 is cut to form the opening 26b.

Next, assembling procedure of the above coupling for high-pressure fluid will be explained. At first, the washer 18 is inserted into the accommodating space 17 that is formed in the fluid route 16 of the block 14. Then, the C-shaped ring 25 with the opening 25c is screwed to the female screw hole 15 to prevent the washer 18 from dropping. Then, the polygonal ring 26 is inserted into the polygonal hole 25b of the C-shaped ring 25. At this moment, the opening 26b of the polygonal ring 26 and the opening 25c of the C-shaped ring 25 should be overlapped with each other.

On the other pipe 11, the box nut 12 and the bush 13 are mounted, and the pipe 11 is on standby at the lower position of FIGS. 5(a) and 5(b). The box nut 12 is sufficiently retreated rearward so as not to be interfered with the block 14, and the pipe 11 with the bush 13 near the end thereof is lifted from the lower position of FIGS. 5(a) and 6(b) to pass the notched portion 14a. The end portion 11b of the pipe 11 successively passes the opening 25c of the C-shaped ring 25 and the opening 26c of the polygonal ring 26, and is accommodated in the hole 26a of the polygonal ring 26. After that, the box nut 12 is moved forward so as to be screwed to the female screw hole 15, and is fastened and fixed thereto, which completes the assembling. At the completion, the pipe 11 is stably supported at two points that are the box nut 12 and the hole 26a of the polygonal ring 26 at the end portion 11b thereof.

For disassembling the coupling, the box nut 12 is loosened first so as to be removed from the block 14, and the box nut 12 is retreated backward. Then, while confirming the position of the notched portion 14a of the block 14, the pipe 11 is swung to the position. The pipe 11 reaches the notched portion 14a from the polygonal ring 26 through the C-shaped ring 25, and comes out of the block 14. After that, the polygonal ring 26 is drawn out, the C-shaped ring 25 is removed by loosening its screw, and finally, the washer 18 is drawn out.

With this embodiment, the pipe 11 does not move at all in a direction of its length, so that the coupling can be mounted and dismounted without removing the other end of the pipe 11.

Figure 9A:
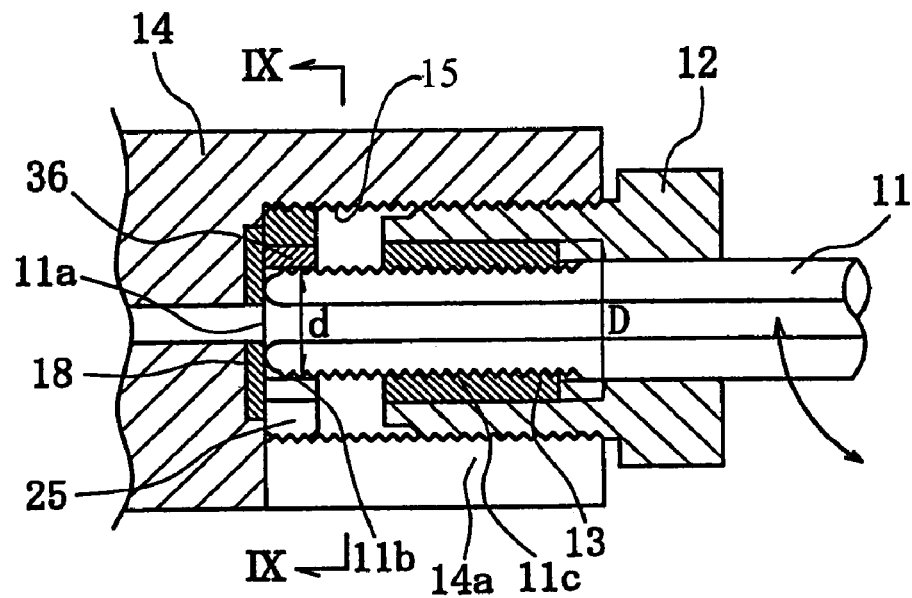
Figure 9B:
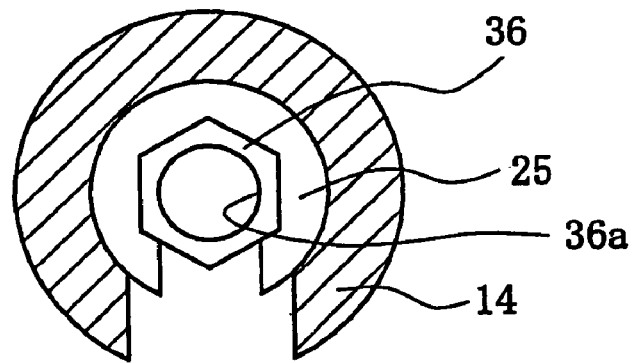
Figure 10:
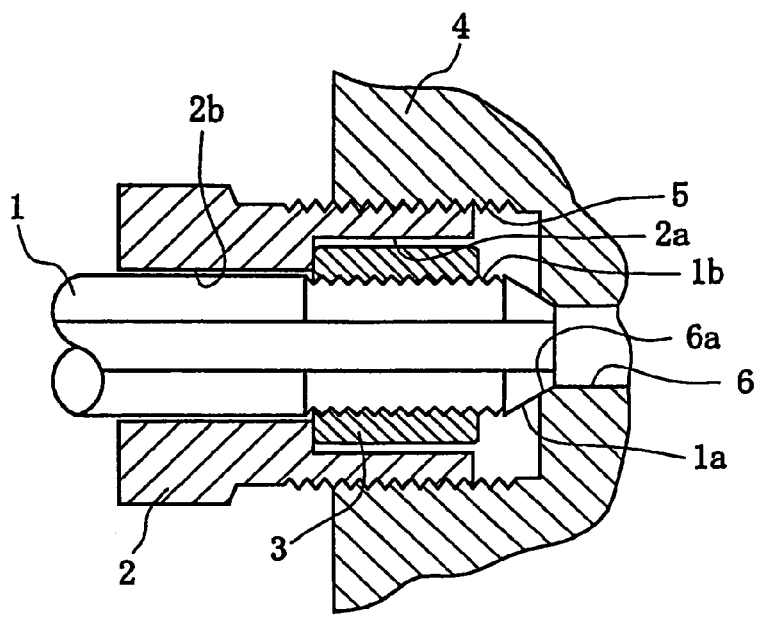
FIG. 10 is a cross-sectional view of a conventional coupling for high-pressure fluid.

FIGS. 9(a) and 9(b) show a coupling for high-pressure fluid according to the third embodiment of this invention, in which FIG. 9(a) is a longitudinal cross-sectional view, and FIG. 9(b) is a cross-sectional view taken along the line IX—IX of FIG. 9(a). In this embodiment, the opening of the polygonal ring 26 in the embodiment shown in FIGS. 5(a) and 5(b) is omitted.

A polygonal ring 36 in this embodiment has a thickness that is almost same as that of the C-shaped ring 25. And, the polygonal ring 36 is inserted to a clearance between the bush 13 and the C-shaped ring 25. To the polygonal ring 36 is drilled a hole 36a where the end portion 11b of the pipe 11 can pass through.

The bush 13 is screwed to a portion near the end of the pipe 11, and the polygonal ring 36 is mounted on the pipe 11 at a position where the polygonal ring 36 closely contacts the bush 13. The end of the pipe 11 projects from the polygonal ring 36, and projected length thereof is longer than the thickness of the C-shaped ring 25. The pipe 11 under the above condition is lifted from the lower portion to the upper portion in FIGS. 9(a) and 9(b), so as to pass the notched portion 14a first. The end portion 11b of the pipe 11 successively passes the opening 25c of the C-shaped ring 25 and enters the female screw hole 15. Under this condition, the polygonal ring 36 is pushed into the polygonal hole 25b of the C-shaped ring 25. After that, the box nut 12 is moved forward so as to be screwed to the female screw hole 15, and is fastened and fixed thereto.

In this embodiment, no opening is formed to the polygonal ring 36, which allows to support the end of the pipe 11 from all directions.

As explained above, in the coupling for high-pressure fluid according to the present invention, which connects a pipe in which high-pressure fluid flows, and a fluid route formed in a block with each other, a soft washer is inserted into an end portion of the fluid route, and the washer and an end face of a pipe is press-contacted with each other. Thus, even when the press-contact portion wears, only the washer has to be replaced, which considerably extends the life of the coupling.

In addition to the above, the above coupling for high-pressure fluid further includes: a pipe with an inverse male screw near an end thereof; a bush with larger diameter than that of the pipe and screwed to the inverse male screw; a box nut with a larger diameter hole, through which the bush can pass, on a tip end side, and with a smaller diameter hole, through which the pipe passes, on a base end portion side; a block with a female screw hole that is screwed to the box nut, and with a notched portion through which the pipe with the bush screwed thereto can pass; a fluid route opened at a the bottom portion of the female screw hole of the block; a washer made form soft material that is inserted into an accommodating space of the fluid route on the female screw hole side; a C-shaped ring having a polygonal hole at a central portion thereof, a male screw at the outer periphery thereof that is screwed to a female screw of the female screw hole and an opening that is overlapped with the notched portion though which the end of the pipe can pass; and a polygonal ring being engaged with the polygonal hole of the C-shaped ring and having a hole for supporting the end portion-of the pipe at the central portion thereof can be mounted. Thus, the coupling can be mounted and dismounted without moving the pipe in a direction of its length.

What is claimed is:

1. A coupling for high-pressure fluid comprising:
a pipe having an inverse male screw near an end thereof;
a bush having a larger diameter than that of said pipe, said bush being screwed to the inverse male screw;
a box nut having a larger diameter hole, through which said bush can pass, on a tip end side, and a small diameter hole, through which the pipe passes, on a base end side;
a block having a female screw hole that is screwed to said box nut;
a fluid route opened at a bottom portion of the female screw hole of the block;
a washer made of soft material, said washer being inserted in an accommodating space at an end portion of the fluid route on the female screw hole side; and a ring being screwed to a female screw of the female screw hole to support said washer at a predetermined position, said ring having a polygonal hole for supporting an end portion of the pipe which passes the box nut and of which end face abuts the washer.

2. The coupling for high-pressure fluid as claimed in claim 1, wherein said end face of the pipe is a ring-shaped circular face.

3. A coupling for high-pressure fluid comprising:

a pipe having an inverse male screw near an end thereof;

a bush having a larger diameter than that of said pipe, said bush being screwed to the inverse male screw;

a box nut having a larger diameter hole, through which said bush can pass, on a tip end portion, and a small diameter hole, through which the pipe passes, on a base end portion;

a block having a female screw hole that is screwed to said box nut and a notched portion through which said pipe to which the bush is screwed can pass;

a fluid route opened at a bottom portion of a female hole of said block;

a washer made of soft material, said washer being inserted in an accommodating space at an end portion of the fluid route on the female screw hole side; and a C-shaped ring having a polygonal hole at a central portion thereof, a male screw at the outer periphery thereof that is screwed to a female screw of the female screw hole and an opening that is overlapped with the notched portion though which the end of the pipe can pass; and a polygonal ring being engaged with said polygonal hole of the C-shaped ring, said polygonal ring having a hole for supporting the end portion of the pipe at a central portion thereof.

* * * * *